No. 894,835. PATENTED AUG. 4, 1908.
R. JOHNSON.
INCUBATOR ALARM.
APPLICATION FILED FEB. 20, 1907.
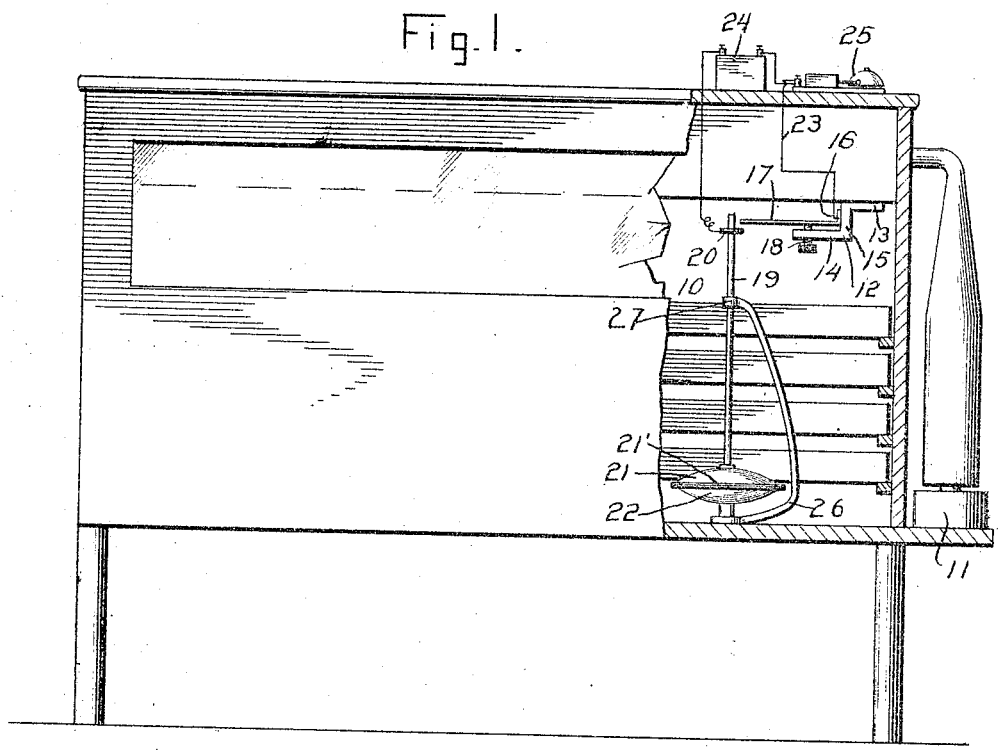
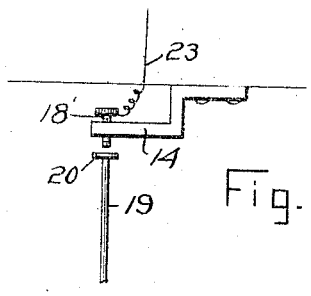

UNITED STATES PATENT OFFICE.

REBECCA JOHNSON, OF MAXWELL, IOWA.

INCUBATOR-ALARM.

No. 894,835.  Specification of Letters Patent.  Patented Aug. 4, 1908.

Application filed February 20, 1907. Serial No. 358,482.

*To all whom it may concern:*

Be it known that I, REBECCA JOHNSON, a citizen of the United States, residing at Maxwell, in the county of Story, State of Iowa, have invented certain new and useful Improvements in Incubator-Alarms; and I do hereby declare the following to be a full, clear, and exact description of the invention, such as will enable others skilled in the art to which it appertains to make and use the same.

This invention has relation to electrically operative alarms for incubators that are sounded when the temperature in the incubator rises to an undue degree.

The nature of the invention comprises an electrical contacting device secured to a stationary part of the chamber and a vertically supported rod provided with a disk adapted to be brought into contact with said contacting device, the said rod being stepped upon a thermostatic expansible bearing and an electric circuit comprising a battery alarm bell, one electrode of said circuit being connected with said contacting device and the other electrode with the disk on the rod whereby when the disk is expanded through the medium of undue heat the rod will be raised and its disk brought in contact with the first mentioned contacting device closing the circuit and ringing the alarm.

Reference is to be had to the annexed drawings forming a part of this specification in view of which the invention will first be described with respect to its construction and mode of operation and then be pointed out in the subjoined claims.

Of the said drawings—Figure 1 is a diagrammatical view of an incubator chamber with my improvement applied thereto. Fig. 2 is a detail view, in side elevation, showing a slight modification.

Similar numerals of reference designate similar parts or features as the case may be, wherever they occur.

In the drawings, having particular reference to Figs. 1, 2 and 3, 10 designates an incubating chamber, which may be of any ordinary construction for supporting egg-trays and provided with heating means for warming the chamber, which heating means may consist primarily of a lamp 11 and means for conveying the heat therefrom into pipes located in water in an overhead tank or other suitable means with all of which my invention is not directly concerned, and therefore the same is not fully illustrated.

12 designates a bracket having a base, 13, by which it may be secured to any stationary part of the chamber, which bracket is provided with an arm, 14, offset from the base by an angular part, 15, to which latter part is secured the angular base 16 of a spring finger, 17, which normally extends outward parallel with the arm 14, but in slightly spaced relationship therefrom, and extends preferably beyond the end of said arm. A set screw 18 is tapped through the arm and bears at its free end against the finger 17 so as to adjust its position for a purpose to be presently explained.

19 designates a rod supported vertically in the chamber by a standard 26, the lower end of which is secured on the bottom of the incubator, and serves as a support for the thermostatic device, while its upper end is provided with a collar 27, forming a guide for the said rod. The latter is provided with a disk or collar, 20, which is arranged in proximity to the finger, so that by a slight raising of the rod the disk will be brought into contact with the finger.

21 designates an expansible bearing for the foot of the rod 19 and upon which it is stepped. The said bearing consists of two concavo-convex thermostatic disks 21 and 22 secured together at their edges 21′. The constructive character of the said bearing, (which is of a thermostatic nature), is such that as the degree of heat increases in the chamber the disks expand in opposite directions and hence act more quickly and efficiently in raising the rod 15 to effect the closing of the circuit, than though the disks were integrally connected as a bulb, or than though a device substantially like a single disk were employed.

The finger 17 is made to constitute one of the electrodes of an electric circuit, by having one end of a wire, 23, connected with its support, said wire being a part of the said electric circuit which includes a battery 24 and an alarm bell 25, the other electrode being comprised in the disk 20 to which the other end of the wire is connected.

In the employment of the invention as thus far described the finger 17 will be adjusted through the medium of the set screw 18 as near to contact with the disk as will be necessary, the distance between the disk 20 and the finger 17 being regulated by a thermometer so that when the disk 20 is raised through the medium of the rod 19 and its step bearing 21 as it will be by increasing the heat in the chamber, said finger and disk will be brought together closing the electric circuit through the wire 23, it being understood that when the circuit is closed the degree of heat in the incubator chamber will be of such height as to be dangerous to the incubation of the eggs contained in the chamber and hence the alarm bell will be sounded and the heating means regulated accordingly.

Instead of providing the support 16 with a contacting device in the form of a spring finger 17 as described, the set screw 18' tapped through the arm 14 as shown in Fig. 1 may have the wire 23 connected to it and so be made to form a contacting point of the electric circuit. In this case the disk 20 will be placed on top of the rod 19 and directly below the projecting point of the set screw 18' so that when the said rod is raised into contact with the said set screw the circuit will be closed and the alarm bell sounded as in the first instance.

It will thus be seen that changes may be made in the form and arrangement of parts constituting the adjustable electrode with which the disk 20 is adapted to be brought into contact by the expansion of the bearing of the rod 19 without materially departing from the general nature and spirit of the invention.

It is to be understood, of course, that the invention will be formed and arranged in the incubator in a manner and position most available and where the devices may be best adapted to perform their functions.

What is claimed is—

The hereindescribed incubator-alarm comprising a standard, a thermostatic device carried upon the said standard, the said device consisting of two concavo-convex disks, arranged with their concave surfaces facing each other, a vertical movable rod supported on the upper side of said disks, a guide device, means connecting it below the disks and extending around the disks and connected with the rod above the disks to guide the rod vertically, the said rod having thereon a stop consisting of a round disk forming an electrode; a bracket for attachment to the incubator, having a horizontal arm forming the other electrode, and an adjusting screw therein to adjust the arm, the bracket normally holding the said other electrode out of contact with the first-mentioned electrode, the electrode attached to said rod being adapted to be brought into contact with the bracket electrode.

In testimony whereof, I affix my signature, in presence of two witnesses.

REBECCA JOHNSON.

Witnesses:
O. W. PARKER,
H. I. HOUGHTON.